(12) United States Patent
Onishi et al.

(10) Patent No.: US 8,300,500 B2
(45) Date of Patent: Oct. 30, 2012

(54) UNDERWATER DETECTION DEVICE

(75) Inventors: Yuriko Onishi, Nishinomiya (JP); Satoshi Misonoo, Nishinomiya (JP)

(73) Assignee: Furuno Electric Company, Ltd., Nishinomiya, Hyogo (JP)

( * ) Notice: Subject to any disclaimer, the term of this patent is extended or adjusted under 35 U.S.C. 154(b) by 192 days.

(21) Appl. No.: 12/850,469

(22) Filed: Aug. 4, 2010

(65) Prior Publication Data
US 2011/0032801 A1    Feb. 10, 2011

(30) Foreign Application Priority Data
Aug. 5, 2009   (JP) .................................. 2009-182203

(51) Int. Cl.
*B06B 1/00*   (2006.01)
(52) U.S. Cl. ......................................................... 367/98
(58) Field of Classification Search .................... 367/98, 367/152
See application file for complete search history.

(56) References Cited

U.S. PATENT DOCUMENTS
2005/0226099 A1* 10/2005 Satoh et al. ...................... 367/99
2011/0032801 A1*  2/2011 Onishi et al. .................. 367/152
2011/0273963 A1* 11/2011 Onishi et al. ..................... 367/93

FOREIGN PATENT DOCUMENTS
JP   2003-322678 A   11/2003
* cited by examiner

*Primary Examiner* — Daniel Pihulic
(74) *Attorney, Agent, or Firm* — Birch, Stewart, Kolasch & Birch, LLP

(57) ABSTRACT

This disclosure provides a detection device, which includes a transceiving module for periodically transmitting a detection pulse signal toward a space and receiving a reflection wave from a target object as a reception signal, a signal loading module for generating a distance section row by dividing a given detection distance range into a plurality of distance sections, obtaining reception data by sequentially sampling the reception signal for every distance section, and storing the reception signal in a memory, and an interference processing module for sequentially performing interference removal processing for the reception data of each of the distance sections stored in the memory. The interference processing module includes an interference wave determination module for determining for every distance section whether the reception data of the distance section row including a target distance section is resulting from an interference wave, a signal generating module, if the reception data is determined to be resulting from the interference wave for generating data to be displayed based on one or more reception data other than the reception data in proximity to the reception data at least either in a distance direction or a transmission cycle direction, and if the reception data is determined to be resulting from the reflection wave, for using the reception data as the data to be displayed, and a display module for displaying the data to be displayed.

5 Claims, 9 Drawing Sheets

FM TRANSMISSION SIGNAL

MATCHED FILTER INPUT SIGNAL (RECEPTION SIGNAL)

MATCHED FILTER OUTPUT SIGNAL

UNDERWATER DETECTION DEVICE

CROSS-REFERENCE TO RELATED APPLICATION(S)

The application claims priority under 35 U.S.C. §119 to Japanese Patent Application No. 2009-182203 which was filed on Aug. 5, 2009, the entire disclosure of which is hereby incorporated by reference.

TECHNICAL FIELD

The present invention relates to a detection device, such as an underwater detection device or a radar device, provided with an interference removal function for removing interferences which originate in detection pulse signals emitted from other detection devices.

BACKGROUND

When other fishing boats operated near a ship concerned exist, a transmission signal is transmitted from a fish finder equipped on another boat, and a comparatively strong reflection wave reflected to the water bottom is received by a fish finder equipped on the ship concerned and, thus the reflection wave appears as an interference wave in a detection image. JPA 2003-322678 discloses a technique for removing the interference wave. The interference removal technique compares reception data received based on a current transmission with reception data at the same depth among the reception data received based on a previous transmission, and sequentially sets, in the depth direction, a lower level data with as current reception data to be displayed at the depth concerned.

In JPA 2003-322678, an echo signal from the same target object, such as a school of fish, is received every time as a signal of substantially the same level. For this reason, when comparing the current reception data with the previous reception data at the same depth, and selecting the lower level data, the echo signal from the target object is seldom spoiled because both the reception data have substantially the same level. Meanwhile, the interference signal is often received as a signal of a stronger level than the echo signal from a normal school of fish or the like, at a different depth position for the previous time and the current time. In addition, the interference signals are less often received consecutively at the same depth. Therefore, even if the current reception data is compared with the previous reception data at the same depth and the lower level data is selected, data which is not the interference signal will be selected and, thus, the interference signal will not be displayed.

Meanwhile, in recent years, a fish finder provided with a high distance resolution where an echo from a small target object, such as a single fish, can be identified has been developed. However, if the above-mentioned interference removal function is applied to the fish finder with the high distance resolution, a problem may arise in which the echo from the single fish and the small target object will be spoiled as well as the interference wave. That is, it may be considered that, by the distance resolution in the depth direction being high, the single fish moves to a different depth during a transmission cycle, and relevance will be lost between the reception data at the same depth which are obtained by the receptions of the previous time and the current time (i.e., in the temporal direction). More specifically, by the single fish moving in the depth direction, if the previous reception data is at a predetermined level and the current reception data is substantially at zero, at a certain depth, the current reception data is selected for the depth concerned. Conversely, if the previous reception data is substantially at zero and the current reception data is at the predetermined level, the previous reception data will be selected. Therefore, the zero level will be selected for both the cases.

SUMMARY

The present invention is made in view of the above states, and provides a detection device that can perform a determination of being an interference wave with a higher precision.

According to an aspect of the invention, a detection device includes a transceiving module for periodically transmitting a detection pulse signal toward a space and receiving a reflection wave from a target object as a reception signal, a signal loading module for generating a distance section row by dividing a given detection distance range into a plurality of distance sections, obtaining reception data by sequentially sampling the reception signal for every distance section, and storing the reception signal in a memory, and an interference processing module for sequentially performing interference removal processing for the reception data of each of the distance sections stored in the memory. The interference processing module includes an interference wave determination module for determining for every distance section whether the reception data of the distance section row including a target distance section is resulting from an interference wave, a signal generating module, if the reception data is determined to be resulting from the interference wave for generating data to be displayed based on one or more reception data other than the reception data in proximity to the reception data at least either in a distance direction or a transmission cycle direction, and if the reception data is determined to be resulting from the reflection wave, for using the reception data as the data to be displayed, and a display module for displaying the data to be displayed.

The interference wave determination module may include a first feature value calculating module for calculating a first feature value based on each of the reception data in the distance section row for a current transmission, a second feature value calculating module for calculating a second feature value based on each of the reception data in the distance section row for a previous transmission, a first comparison module for comparing the first feature value with the second feature value, a second comparison module for comparing a preset one of the reception data in the distance section row for the current transmission and the corresponding first feature value with a predetermined threshold, and a determination module for determining that the reception data of the target distance section is resulting from the interference wave if the first feature value is greater than the second feature value and the preset one exceeds the predetermined threshold.

The distance section row may include a plurality of distance section rows, and each distance section row has distance sections shifted by one distance section from other distance section rows. The interference wave determination module may include a first feature value calculating module for calculating a first feature value group based on each of the reception data of the plurality of distance section rows for current transmissions, a second feature value calculating module for calculating a second feature value group based on each of the reception data of the plurality of distance section rows for previous transmissions, a comparison module for comparing the first feature value group with the second feature value group for every corresponding feature value, and a determination module for determining that the reception data of the target distance section is resulting from the interference wave if substantially all the feature values of the first feature value group are greater than the feature values of the second feature value group, respectively.

The distance section row may include a plurality of distance section rows, and each distance section row may have distance sections shifted by one distance section from other distance section rows. The interference wave determination module may include a first feature value calculating module for calculating a first feature value group based on each of the reception data of the plurality of distance section rows for current transmissions, a second feature value calculating module for calculating a second feature value group based on each of the reception data of the plurality of distance section rows for previous transmissions, a first comparison module for comparing the first feature value group with the second feature value group for every corresponding feature value, a second comparison module for comparing each of the reception data of the target distance section row including the target distance section with a predetermined threshold, and a determination module for determining that the reception data of the target distance section is resulting from the interference wave, if substantially all the feature values of the first feature value group are greater than the feature values of the second feature value group, respectively, and if substantially all the reception data exceed the predetermined threshold.

The distance section row may include a plurality of distance section rows, and each distance section row may have distance sections shifted by one distance section from other distance section rows. The interference wave determination module may include a first feature value calculating module for calculating a first feature value group based on each of the reception data of the plurality of distance section rows for current transmissions, a second feature value calculating module for calculating a second feature value group based on each of the reception data of the plurality of distance section rows for previous transmissions, a first comparison module for comparing the first feature value group with the second feature value group for every corresponding feature value, a second comparison module for comparing each of the feature values of the first feature value group with a predetermined threshold, and a determination module for determining that the reception data of the target distance section is resulting from the interference wave, if substantially all the feature values of the first feature value group are greater than the feature value of the second feature value group, respectively, and if substantially all the feature values exceed the predetermined threshold.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, several embodiments of the invention are described with reference to the appended drawings.

Embodiment 1

Figure 1:
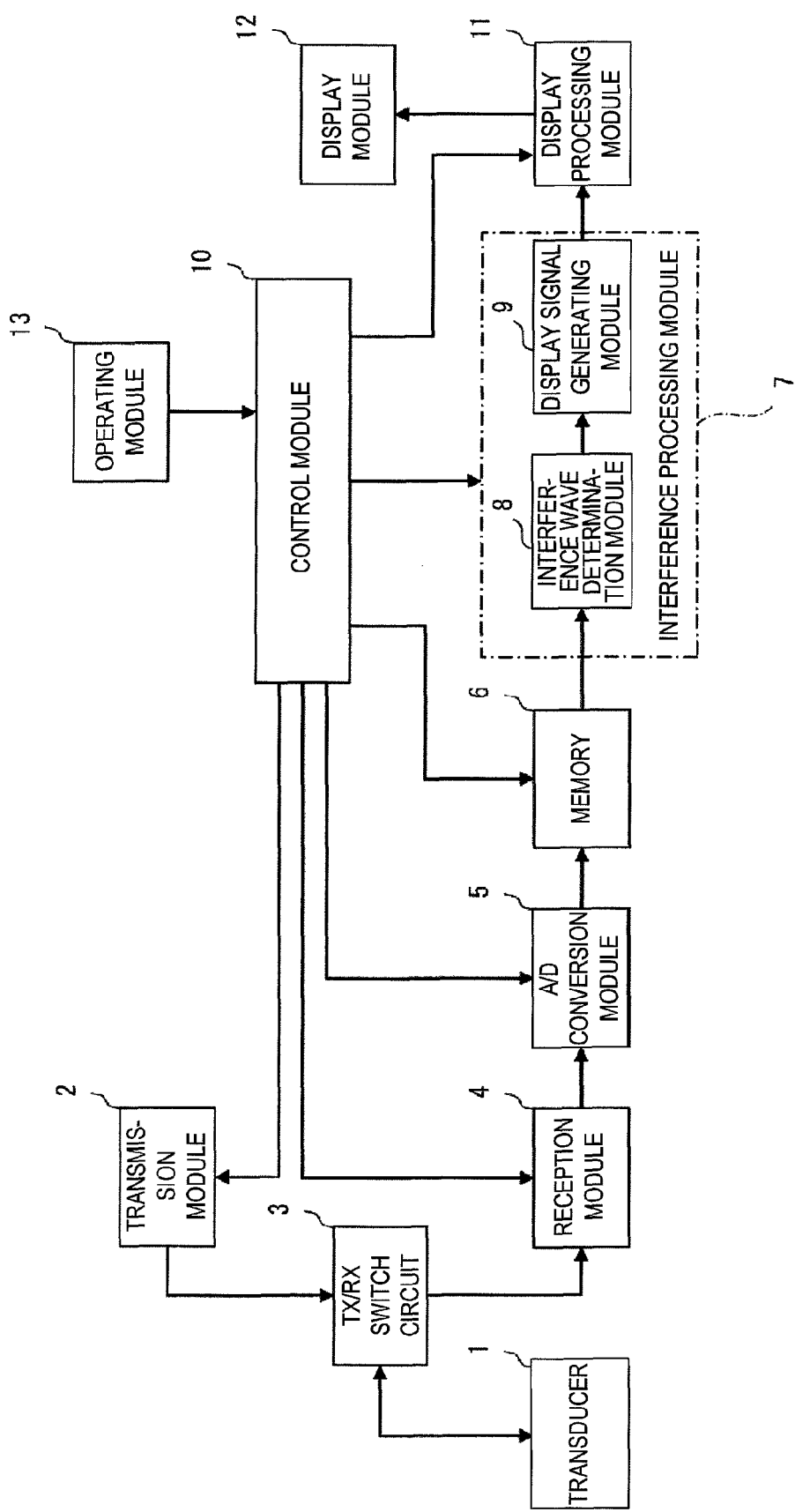
FIG. 1 is a circuit block diagram showing an embodiment when applying the present invention to an underwater detection device.

FIG. 1 is a circuit block diagram showing an embodiment of the invention in a case where the invention is applied to an underwater detection device. In FIG. 1, the underwater detection device includes a transducer 1, which is mounted on the bottom or the like of a ship. In this embodiment, ships are described for a water vessel carrying the underwater detection device of this embodiment; however, the ships may include a surface vessel, such as a boat, ship, yacht, and a submergence vessel, such as a submarine.

The transducer 1 is configured so that a necessary number of ultrasonic transducers which are electromechanical conversion elements bundled together, with their wave transmission faces being oriented toward one direction (e.g., toward a water bottom). The transducer 1 transmits an ultrasonic wave underwater, and then receives a reflection wave from fish or the water bottom. The transmission module 2 generates a high frequency drive signal of a predetermined power that excites the ultrasonic transducers for every predetermined transmission cycle. The generated drive signal is outputted to the transducer 1 through a transmission-and-reception switch circuit 3. The transmission-and-reception switch circuit 3 switches a signal path between a path leading the drive signal from the transmission module 2 to the transducer 1, and a path leading the reception signal from the transducer 1 to a reception module 4.

The reception module 4 receives the reflection wave received by the transducer 1, and, after giving predetermined signal processing, such as gain adjustment for a depth, to the reflection wave, it outputs the processed signal to an A/D conversion module 5. The A/D conversion module 5 samples the reception signal inputted from the reception module 4 in a level direction at a predetermined sampling cycle, and then converts it into a digital value as the reception data. This sampling operation is started from a wave transmission timing, and is performed repeatedly for a round-trip period of time of the ultrasonic wave for a depth position corresponding to a given detection range. The sampling cycle determines a resolution in the depth direction. The reception data for every transmission is obtained sequentially for every depth section in the depth direction (for example, the reception data D1, D2, D3 . . . ). A memory 6 stores the reception data. The memory 6, as described later, has a storage capacity for storing the reception data for a predetermined number of transmissions. For example, the memory 6 has a capacity for storing the reception data to use the maximum display area of the display module 12, taking the depth, the distance resolution, and the transmission cycle direction into consideration.

Note that, as a method of implementing the high-resolution underwater detection in the depth direction, although a method of transmitting the ultrasonic signal from the transducer by a short-width pulse and other methods are known, a method using a matched filter is adopted in this embodiment.

Figure 2A:
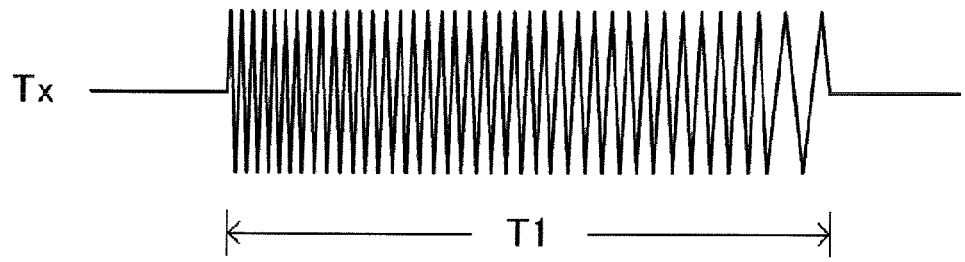
FIG. 2A shows an example waveform chart of a transmission signal.
Figure 2B:
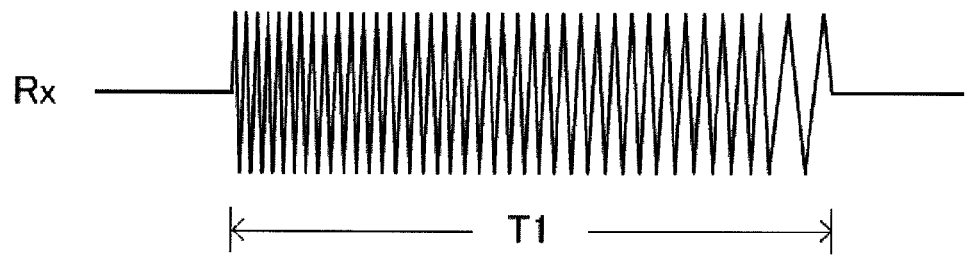
FIG. 2B shows an example waveform chart of a reception signal.

Here, an operation of the matched filter is briefly described with reference to FIGS. 2 and 3. The transducer 1 generates, as a transmission signal Tx, a pulse (pulse signal) having a time width T1 containing a frequency-modulated sine wave burst signal, where a frequency changes continuously from a predetermined frequency within a certain range during the time width T1 (for example, the frequency changes continuously from 130 kHz to 70 kHz). Thus, the frequency gradually decreases with time. Each of the ultrasonic transducers of the transducer 1 is excited by this signal, and transmits underwater the ultrasonic signal having the same waveform as that of FIG. 2A. When the pulse of the ultrasonic signal transmitted underwater reflects on fish and comes back as the echo, this echo is received by the transducer 1 (reception signal Rx). The waveform of the reception signal Rx at this time point has, as shown in FIG. 2B, fundamentally the same waveform as the transmission signal Tx shown in FIG. 2A. However, in fact, the reception signal may contain many noises due to influences of echoes from a submerged object, propeller noises and the like, and it will not have an ideal waveform as shown in FIG. 2B. However, the reception signal and the transmission signal are treated herein as having the same waveform for convenience.

Figure 3A:
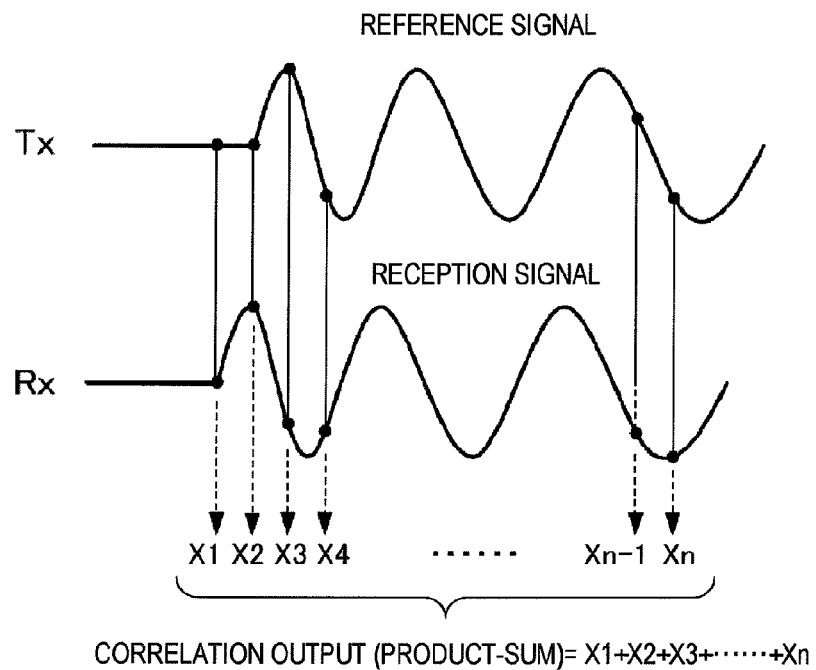
FIGS. 3A and 3B are views illustrating a principle of the correlation processing using a matched filter.
Figure 3B:
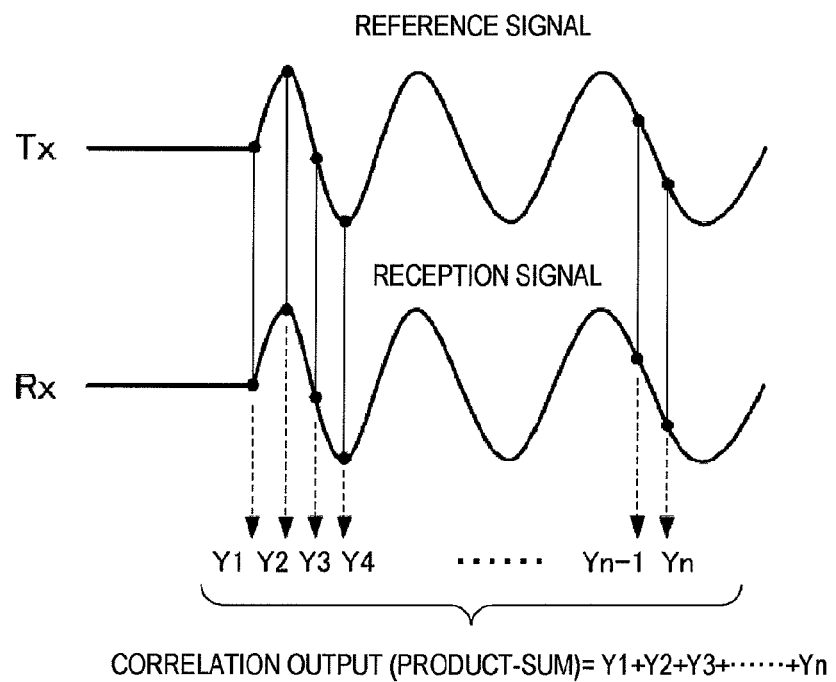

The reception module 4 has the matched filter. FIGS. 3A and 3B are views illustrating a principle of correlation processing using the matched filter. A reference signal Tx of FIG. 3A is a chirp signal where a frequency becomes lower with time in this embodiment. Waveform data of the reference signal Tx is stored in advance in the memory (not illustrated). FIG. 3B shows a signal to be compared with the reference signal Tx, which is specifically the reception signal Rx (i.e., an input signal of the reception module 4).

In the correlation processing, a product-sum operation is performed, where, while phases of the reference signal Tx and the reception signal Rx are shifted little by little, a level of the reception signal Rx is multiplied by a level of the reference signal Tx at each time point, and the products are then summed. FIG. 3A shows a state of the product-sum operation at a certain time point, where a level value of the reception signal Rx is multiplied by a level value of the reference signal Tx at a predetermined sampling interval, and the products X1, X2, . . . , Xn are summed over a sampling interval. Then, this summed value X1+X2+ . . . +Xn is made to be a correlation output. FIG. 3B shows a state of the product-sum operation at another time point, and also in this case, the level value of the reception signal Rx is multiplied by the level value of the reference signal Tx at a predetermined sampling interval, and the products Y1, Y2, . . . , Yn are summed over the sampling interval. Then, this summed value Y1+Y2+ . . . +Yn is made to be a correlation output.

The reception module 4 outputs the signal having a level corresponding to a degree of coincidence between the reception signal Rx and the reference signal Tx. If the degree of coincidence becomes greater, the level of the signal outputted from the reception module 4 will be higher, and, on the other hand, if the degree of coincidence becomes less, the level of the signal outputted from the reception module 4 will be lower. In the case of FIG. 3A, because the degree of coincidence between the phases of the reference signal Tx and the reception signal Rx is low, the value of the correlation output becomes small. On the other hand, in the case of FIG. 3B, because the phases of the reference signal Tx and the reception signal Rx is in agreement with each other, the value of the correlation output will be the maximum. In this way, according to the correlation processing, because not only the level information on the signal but also the phase information on the signal is taken in by the product-sum operation to perform the detection, a detecting accuracy of the signal can be improved compared with the case where the signal detection is performed only based on the level.

Figure 2C:
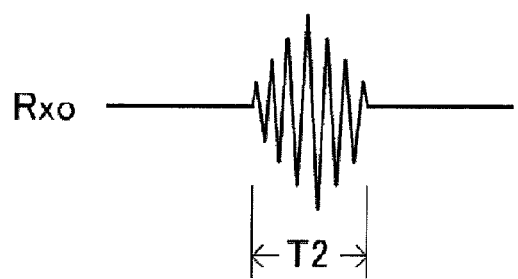
FIG. 2C shows an example waveform chart of a correlation processing output signal.

By performing the above correlation processing, a reception signal Rxo corresponding to the reference signal Tx is extracted from the matched filter, as shown in FIG. 2C. This reception signal Rxo is a burst signal which is similar to the transmission signal Tx; however, it contains only a signal of the same band as the reference signal Tx (for example, about 100 kHz), and signals outside the band are cut off. That is, a pulse width T2 of the reception signal Rxo is shorter than the pulse width T1 of the transmission signal Tx. In this way, as a result of the correlation processing with the matched filter, because the reception signal Rxo outputted from the reception module 4 is pulse-compressed, a resolution of the echo improves and a single fish or the like can be separated with a sufficient accuracy. Therefore, the sampling cycle relevant to the A/D conversion module 5 may be set to an interval corresponding to the time width of the reception signal Rxo.

An interference processing module 7 includes an interference wave determination module 8 and a display signal generating module 9. In this embodiment, the interference wave determination module 8 reads out sequentially, from the memory 6, the reception data resulting from the current transmission and the previous transmission, and using both the data, it determines whether interested reception data among the reception data resulting from the current transmission is reception data resulting from the interference wave. The interested reception data is reception data for a target depth section to which the interference processing is to be applied, and referred to as receiving data D at an interference determination processing timing, at which the current reception data D1, D2, D3, . . . temporarily stored in the memory 6 are determined whether they are reception data resulting from the interference wave, sequentially in an order from the reception data D1. The display signal generating module 9 sets by predetermined processing a final value of the interested reception data according to the result by the interference wave determination module 8.

Figure 4:
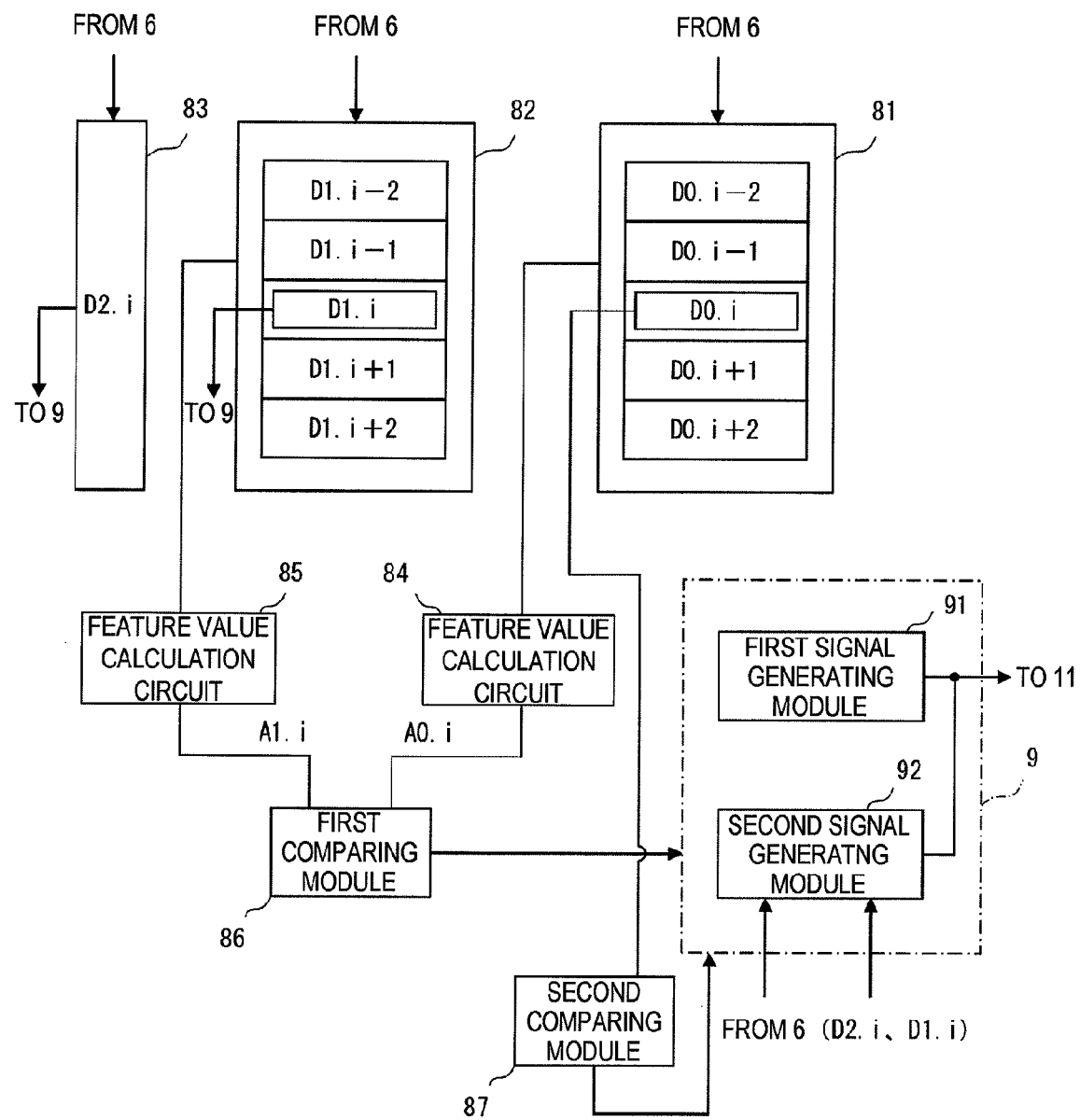
FIG. 4 is a schematic block diagram for illustrating an example of a processing procedure of an interference removal module.

FIG. 4 is a schematic block diagram for illustrating an example of processing procedure of the interference processing module 7. In FIG. 4, current reception data D0,k (here, k is a sample position, where k=1 to K), and previous reception data D1,k (here, k is the sample position, where k=1 to K) are read synchronizing with each other in the k-direction. Here, the first subscripts 0 and 1 of the character D are numerical values indicating the number of transmissions to the past direction with respect to the current time, where the subscript 0 indicates the current time, and the subscript 1 indicates the previous time. In addition, the second subscript k of the character D indicates the sample position (corresponding to the depth), as described above. "k=0" means the first sampling immediately after the transmission, and "k=K" means the final sampling in a detection range.

Now, if the interested reception data is set to $D0,i$ ($i=1$ to K), a predetermined number of the reception data before and after the interested reception data $D0,i$ including the interested reception data (here, the total of five data $D0,i-2$, $D0,i-1$, $D0,i$, $D0,i+1$, and $D0,i+2$) are simultaneously taken out by a readout circuit 81. As the readout circuit, what is formed by connecting four delay circuits (such as shift registers) in series, and takes out the outputs synchronizing in parallel, is known. Alternatively, if the memory 6 is not a line memory but a memory where random access is possible, the reception data may be read out by being specified sequentially with successive five addresses at high speed. A readout circuit 82 reads out the previous reception data. A readout circuit 83 reads out the reception data $D2,i$ of the same depth section as the interested reception data $D0,i$ among the reception data before the previous reception data.

The read-out five current and previous reception data are inputted into feature value calculation circuits 84 and 85, respectively. The feature value calculation circuit 84, for example, sums the five inputted level values of the current reception data and averages them ($A0,i$). The feature value calculation circuit 85, for example, sums the five inputted level values of the previous reception data, and averages them ($A1,i$). Each of the feature values $A0,i$ and $A1,i$ acquired by the feature value calculation circuits 84 and 85 is led to a first comparing module 86 where the values are compared. The comparison result is used as determination whether the interested reception data $D0,i$ is resulting from the interference wave. As described later, if $A0,i<A1,i$, the interested reception data $D0,i$ is determined to be resulting from the reflection wave from the target object, and, if $A0,i>A1,i$, the interested reception data $D0,i$ is determined to be resulting from the interference wave.

A second comparing module 87 performs a comparison of whether the reception data $D0,i$ taken out by the readout circuit 81 exceeds a threshold $Ds$ for determining the reception value is resulting from the interference wave. The comparison results from the first and second comparing modules 86 and 87 are outputted to the display signal generating module 9.

The display signal generating module 9 outputs the interested reception data $D0,i$ as the data to be displayed by the first signal generating module 91, except for the case where the first comparing module 86 outputs a resulted signal indicative of $A0,i>A1,i$ and the second comparing module 87 outputs a resulted signal indicative of $D0,i>Ds$. On the other hand, the display signal generating module 9, if $A0,i>A1,i$ and $D0,i>Ds$ as described above (i.e., if the current sampling signal is determined to be resulting from the interference wave), uses two or more reception data of the past at the same depth to, for example, average by a second signal generating module 92 two reception data of the previous reception data $D1,i$ and the further previous reception data $D2,i$ at the same depth from the readout circuits 82 and 83, respectively, to replace the interested reception data $D0,i$ therewith.

The data to be displayed which is generated by the display signal generating module 9 is led to a display processing module 11, and is then mapped in a RAM for display (not illustrated) in the display processing module 11. The stored contents of the RAM for display are repeatedly read out by a display module 12 that displays an image, and are displayed on the display module 12. A control module 10, in response to an instruction input or the like, such as setting of the detection range from an operating module 13, performs an execution instruction of cycle setting of the sampling pulse to the A/D conversion module 5 corresponding to the transmission cycle, the detection range and the like of the transmission module 2, writing to the memory 6, generation processing of a read-out clock, an address and the like, generation of the various processing signals to the interference processing module 7 and the display processing module 11, and calculation processing. The display module 12 displays the reception data for display (refer to FIGS. 6 to 8, where a display image according to this embodiment is shown in FIG. 8), where the vertical axis of a screen image is set to the depth direction, and the horizontal axis is set to the temporal direction (the direction of the number of transmissions). Note that the display image, as being well known, is scrolled from the right end of the screen image to the left by a predetermined dimension for every transmission to display the newest detection image corresponding to a predetermined number of transmissions on the display module 12.

Figure 5:
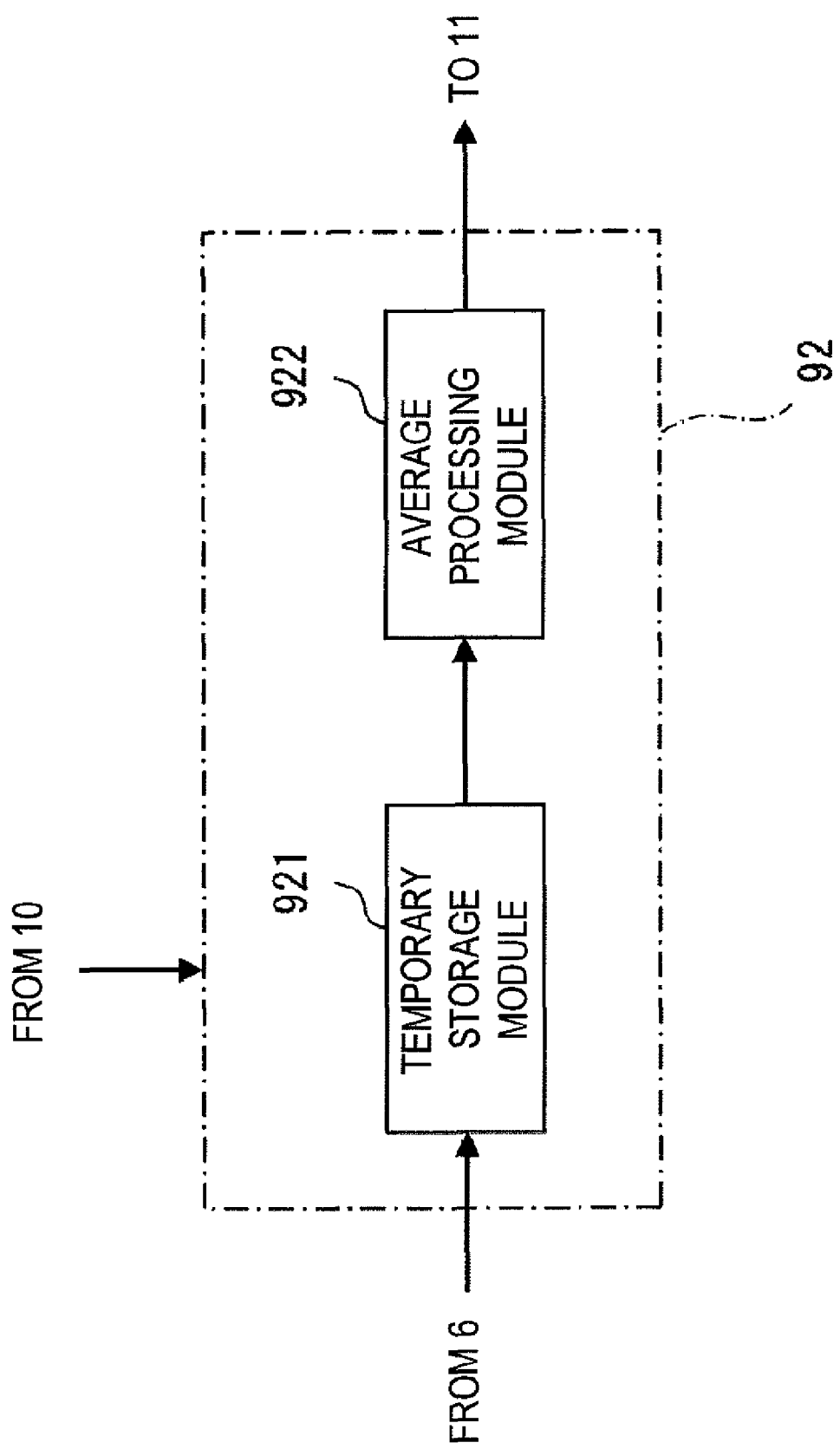
FIG. 5 is a block diagram for illustrating a processing procedure of a second signal generating module.

FIG. 5 is a block diagram for illustrating a processing procedure of the second signal generating module 92. In FIG. 5, if the determination module 8 determines that the interested reception data $D0,i$ is resulting from the interference wave, in response to the instruction signal from the control module 10, a predetermined number of the reception data of the past in the temporal direction at the same depth as the interested reception data $D0,i$ are read out from the memory 6 into a temporary storage module 921 via the readout circuits 82 and 83 (in this embodiment, the previous reception data $D1,i$ and the further previous reception data $D2,i$ before the previous reception data $D1,i$).

An average processing module 922 calculates an average of the sum of the levels of the two reception data $D1,i$ and $D2,i$ to generate the reception data to be displayed, and then outputs it to the display processing module 11. Note that the interference wave is entrapped into (or mixed with) the reception signal, which is caused by the reflection of the ultrasonic signal on the water bottom, transmitted from another underwater detection device equipped on another boat or the like. However, it is rare that the transmission cycles of another underwater detection device equipped on another boat and the underwater detection device equipped on the ship concerned are completely identical. Therefore, there is a low possibility that the interference wave will be continuously entrapped into (or mixed with) the reception signal at the same depth.

Figure 6:
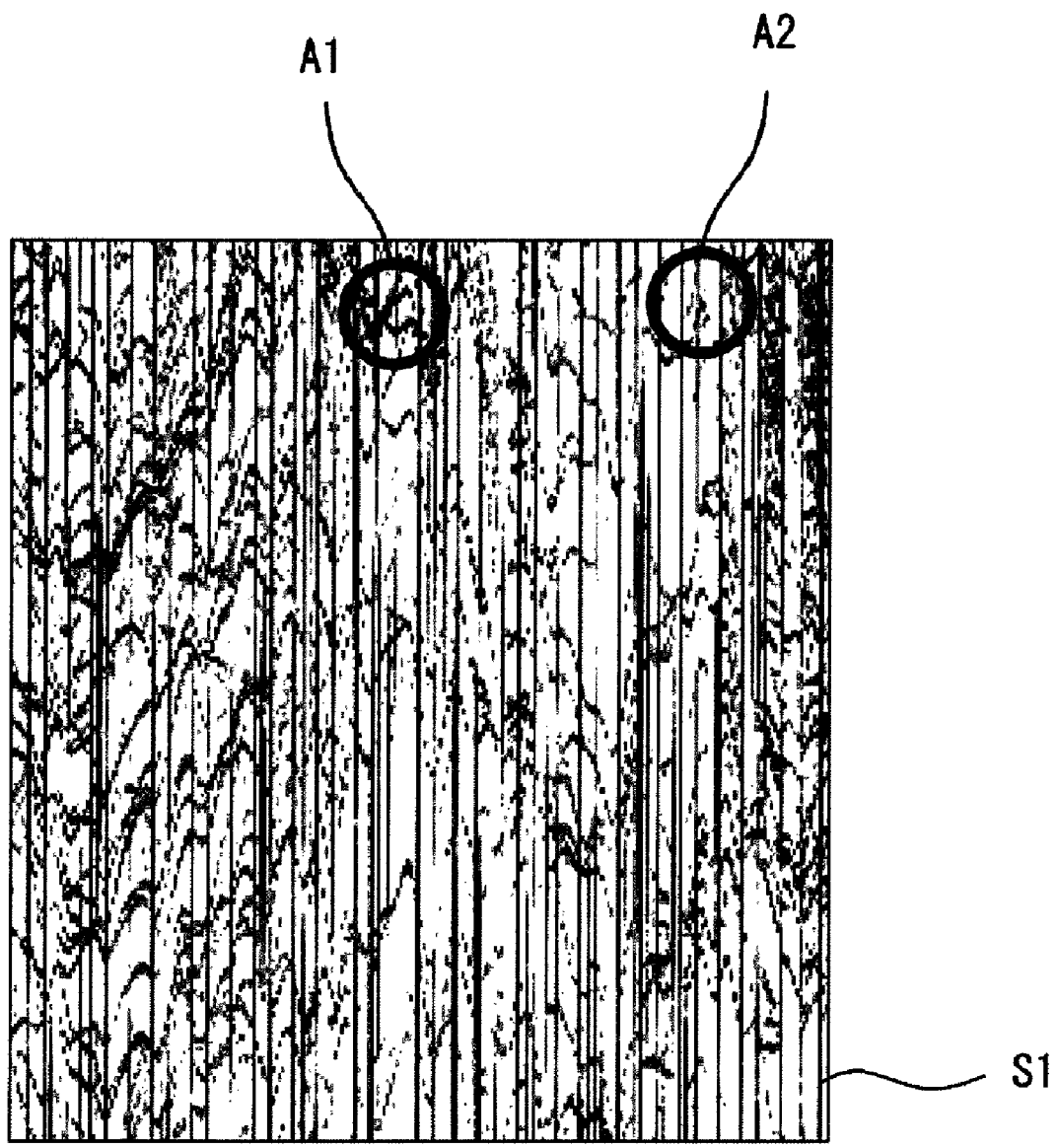
FIG. 6 is an example screen image for illustrating an effect of the interference removal, where a certain depth range is magnified for easier understanding of a depth direction being a high resolution, and the interference removal function is not activated.
Figure 7:
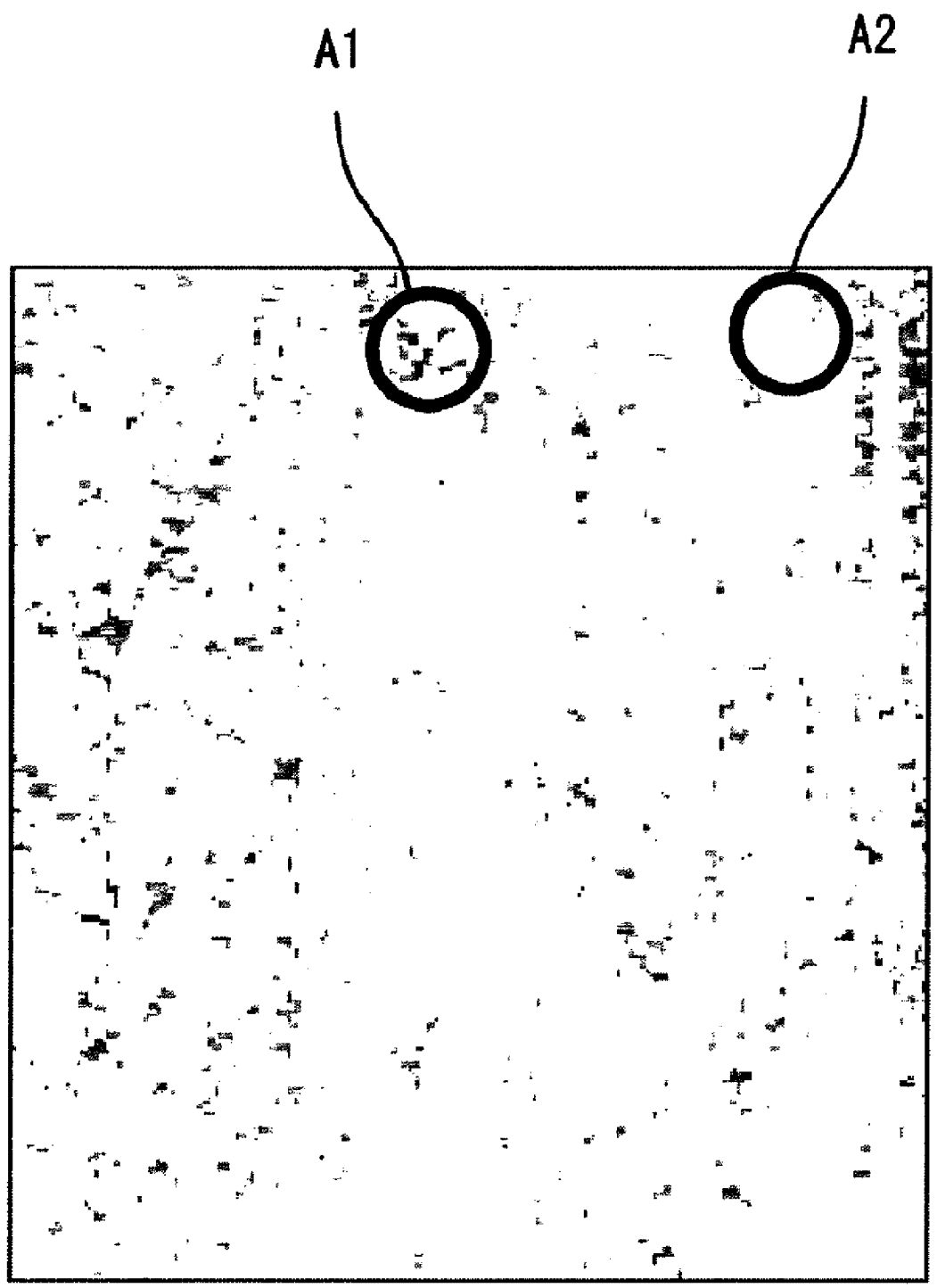
FIG. 7 is an example screen image for illustrating an effect of the interference removal, where a certain depth range is magnified for easier understanding of the depth direction being a high resolution, and the interference removal function disclosed in JPA 2003-22678 is activated.
Figure 8:
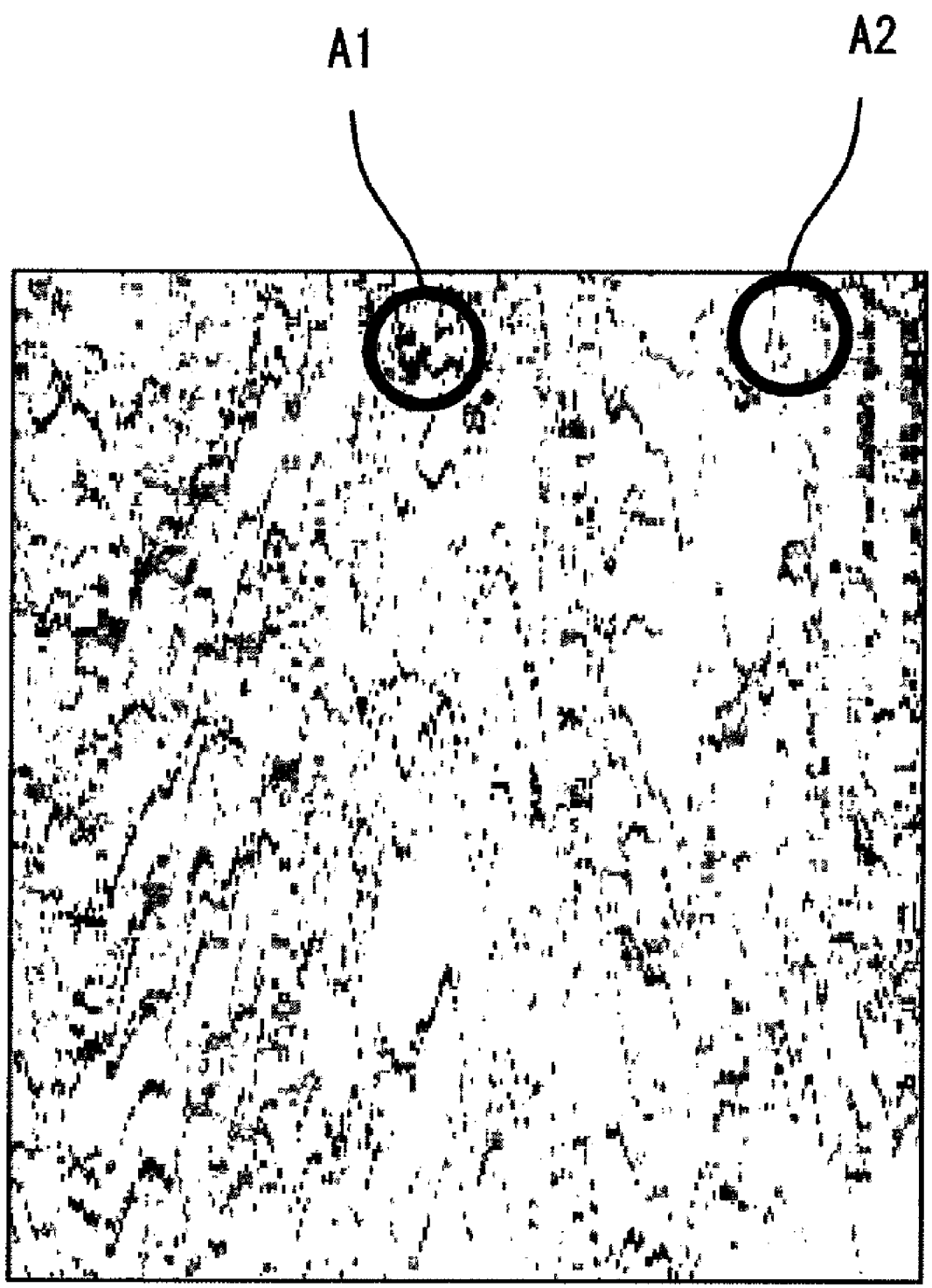
FIG. 8 is an example screen image for illustrating an effect of the interference removal, where a certain depth range is magnified for easier understanding of the depth direction being a high resolution, and the interference removal function of this embodiment is activated.

FIGS. 6 to 8 are screen images for illustrating effects of the interference removal of this embodiment, where a certain depth range is magnified for easier understanding of a depth direction being a high resolution. FIG. 6 shows an example image when the interference removal function is not activated, FIG. 7 shows an example image when the interference removal function disclosed in JPA 2003-22678 is activated, and FIG. 8 shows an example image when the interference removal function of this embodiment is activated.

In FIG. 6, the newest image is displayed as one line along the vertical direction (depth direction) at the right end, and images of the past are arranged in a temporal order toward the left (in the temporal direction). In each line, the reflection wave from an underwater single fish and the like (for example, refer to inside of an area A1 and an area A2) and the interference wave from another boat (for example, an image S1) are displayed. Note that the reflection wave from the water bottom does not appear in this screen image. Although the levels of the reception data can be represented by different colors in the display module 12 which can display a color image, they are represented by gray scale in FIG. 6 for convenience of the illustration. The comparatively long lines in the vertical direction which are dark lines are images by interference waves. As shown in FIG. 6, if a measure for the interference removal is not adopted, many vertical lines which are the images by the interference waves have appeared sporadically and, thus, the screen image is hard to see as the whole, and, moreover, the images of the interference waves are overlapped on the reception image of the reflection wave from the underwater target objects, thereby substantially erasing the reception image.

In FIG. 7, because lower level reception data will be displayed among the previous and current reception data at the same depth, the image S1 (see FIG. 6) by the interference wave is substantially erased from this screen image. On the other hand, if it has a high resolution in the depth direction, when the single fish or the like moves in the depth direction between the previous time and the current time, it can still detect a change in the level of the reception data at the same depth. However, by the detection of such a level change, the lower level reception data is selected at the same depth, the contrast (or color, if colored) of the single fish or the like will be lighter as the whole. Alternatively, if the single fish or the like moves to a different depth, the contrast of the single fish or the like will be displayed after being lowered to a level where a visual recognition thereof at both the depths before and after the movement is difficult on the screen image (refer to the areas A1 and A2).

In FIG. 8, if the interested reception data is resulting from the interference wave, because the averaging processing of the previous reception data and the current reception data at the same depth is performed in the temporal direction to generate such reception data for display, the display data is close to a raw image as shown in FIG. 6 where the interference waves are removed.

The following modified embodiments may also be possible.

Modified Embodiment 1

In the above embodiment, although the determination of being the interference wave is made by the results of both of the comparison between the first feature value and the second feature value, and the comparison between the interested reception data and the threshold, it is not limited to this method, other methods may be used. For example, the comparison determination between the first feature value and the second feature value may be repeated by the predetermined number of the depth sections in the depth direction (depth section row), or the comparison determination between the interested reception data and the threshold may be repeated by the predetermined number of depth sections (depth section row), and whether the interested reception data is resulting from the interference wave may then be determined.

Figure 9:
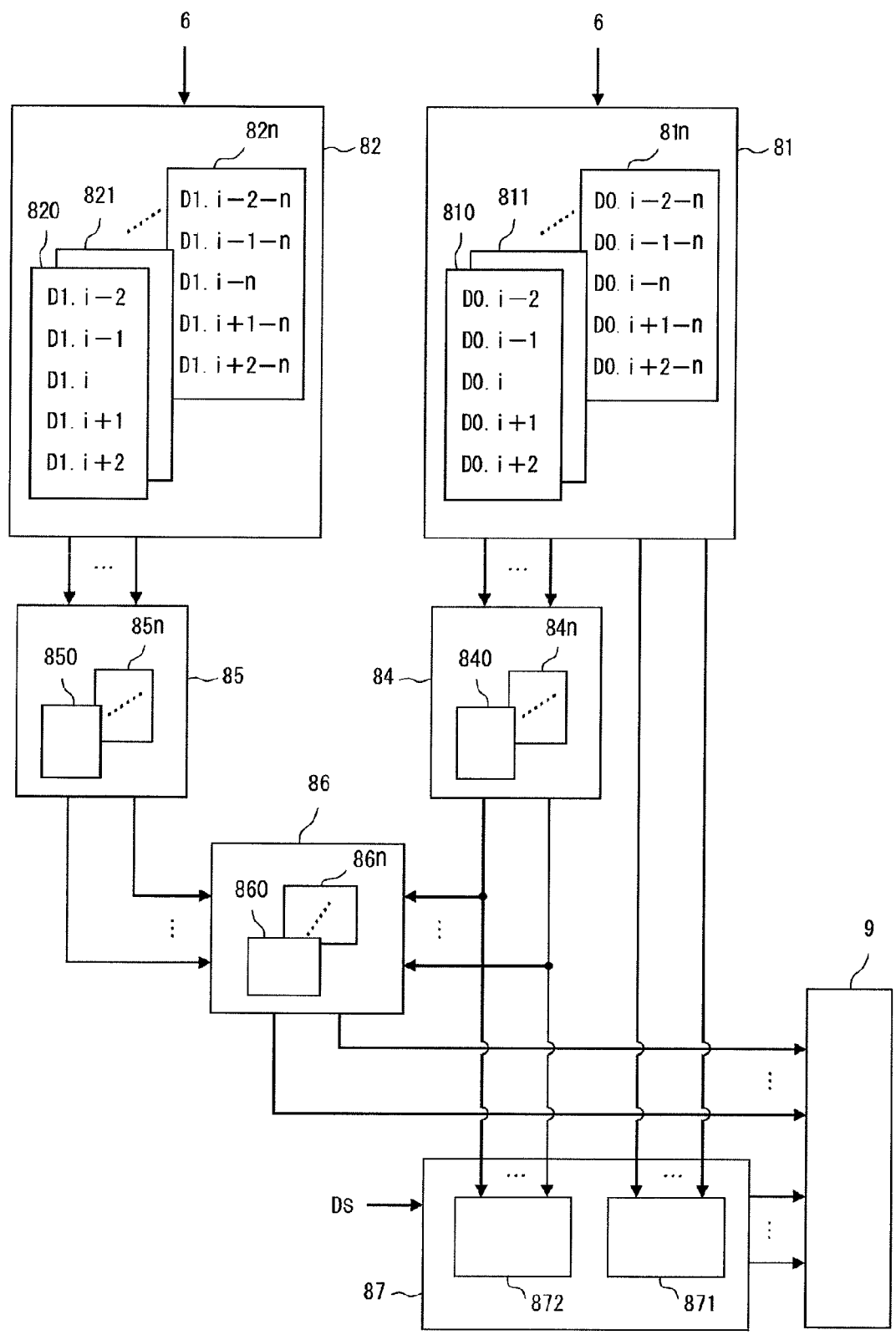
FIG. 9 is a block diagram corresponding to FIG. 4 for implementing another determination method.

FIG. 9 is a block diagram corresponding to FIG. 4 for implementing such a determination method. In FIG. 9, the readout circuits 81 and 82 include, for example, a predetermined number (n+1) of sub readout circuits. The readout circuit 81 includes sub readout circuits 810, 811, . . . , 81n. The sub readout circuit 810 reads out the interested reception data D0,i, and the reception data D0,i−2, D0,i−1, D0,i+1, D0,i+2, similar to the readout circuit 81 of FIG. 4. The sub readout circuit 811 reads out the reception data where the depth sections are shifted by one toward a deeper side with respect to the reception data of the sub readout circuit 810. The sub readout circuit 81n reads out the reception data where the depth sections are shifted by "n" toward the deeper side with respect to the reception data of the sub readout circuit 810 (i.e., the reception data D0,i−2−n, D0,i−1−n, D0,i−n, D0,i+1−n, D0,i+2−n). The readout circuit 82 includes sub readout circuits 820, 821, . . . , 82n. The sub readout circuits 820-82n have the same configuration as the sub readout circuits 810-81n.

The feature value calculation circuits 84 and 85 have the same structure, and each has (n+1) sub calculation circuits 840-84n and 850-85n and calculates each feature value (feature value group) based on the reception data read out from the corresponding sub readout circuits 810-81n and 820-82n, respectively. Specifically, the sub calculation circuit 840 calculates a feature value for the sub readout circuit 810, and the sub calculation circuit 84n calculates a feature value for the sub readout circuit 81n. The sub calculation circuit 850 calculates a feature value for the sub readout circuit 820, and the sub calculation circuit 85n calculates a feature value for the sub readout circuit 82n.

The first comparing module 86 includes sub comparison circuits 860-86n of the same structure. The sub comparison circuit 860 compares the feature value from the sub calculation circuit 840 with the feature value from the sub calculation circuit 850, and the sub comparison circuit 86n compares the feature value from the sub calculation circuit 84n with the feature value from the sub calculation circuit 85n. The comparison result from each of the sub comparison circuits 860-86n is outputted to the display signal generating module 9. That is, in the comparison result by the sub comparison circuits 860-86n, if substantially all the feature values from the sub calculation circuits 840-84n are greater than the feature values from the sub calculation circuits 850-85n, respectively, the interested reception data is determined to be resulting from the interference wave. In this case, whether the interested reception data D0,i exceeds the threshold Ds is not used as a determination element. As described above, by performing such a comparison of the feature values covering a prescribed range in the depth section direction, an erroneous determination due to a sporadic abnormal signal or the like can be prevented.

Modified Embodiment 2

In addition to the above method of the previous modified embodiment, a method to which the following determination elements are added may be adopted. That is, the second comparing module 87 includes one of the sub comparison circuits 871 and 872 in FIG. 9. The sub comparison circuit 871 compares the interested reception data D0,i and the predetermined number of the reception data toward the deeper depth side (for example, "n" reception data D0,i−1, D0,i−n) with the threshold Ds which is set for the comparison with the reception data. The sub comparison circuit 872 compares (n+1) feature values outputted from the sub readout circuits 810, 811, . . . , 81n of the readout circuit 81 with the threshold Ds which is set for the comparison with the feature values. The comparison results from the sub comparison circuits 871 and 872 are outputted to the display signal generating module 9. That is, in the comparison by the sub comparison circuit 871, if substantially all the reception data exceeds the threshold, the interested reception data is determined to be resulting from the interference wave. Further, in the comparison by the sub comparison circuit 872, if substantially all the feature values exceed the threshold, the interested reception data is determined to be resulting from the interference wave.

Then, if the sub comparison circuit 871 determines that the reception data exceeds the threshold and the sub comparison circuits 860-86n determine that the feature values from the feature value calculation circuit 84 are greater, the interested reception data is determined to be resulting from the interference wave, and otherwise, it is determined to be resulting from the reflection wave.

Similarly, if the sub comparison circuit 872 determines that the feature value group exceeds the threshold and the sub comparison circuits 860-86*n* determines that the feature values from the feature value calculation circuit 84 are greater, the interested reception data is determined to be resulting from the interference wave, and otherwise, it is determined to be resulting from the reflection wave.

As described above, by performing such comparisons of the reception data or the feature value up to the prescribed range in the depth section direction with the threshold, an erroneous determination due to the interference wave can be prevented.

Modified Embodiment 3

As for the feature value, it may not be limited to the average value, and may also be a mean value, a frequency value or the like, which is information indicative of the feature.

Modified Embodiment 4

As for the method of replacing the reception signal determined to be the interference wave with the data to be displayed, it may perform interpolation processing (for example, linear interpolation processing), instead of the average processing method. That is, the data to be displayed is obtained by carrying out the interpolation processing of two or more the reception data of the past, a detection image close to an actual situation can be displayed. In this case, it is preferred that interpolation data is compared with original reception data, and a smaller one is used as the final data to be displayed. Further, by not using the reception data resulting from the interference wave for the interpolation processing, the data to be displayed close to actual data can be generated.

Modified Embodiment 5

As for the method of implementing the detection with a high resolution in the depth direction, the detection pulse may simply be shortened, instead of the matched filter method. The present invention is not limited to the high-resolution detection device described above, but may also be applied to existing underwater detection devices and existing radar devices.

In the foregoing specification, specific embodiments of the present invention have been described. However, one of ordinary skill in the technique appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A detection device, comprising:
    a transceiving module for periodically transmitting a detection pulse signal toward a space and receiving a reflection wave from a target object as a reception signal;
    a signal loading module for generating a distance section row by dividing a given detection distance range into a plurality of distance sections, obtaining reception data by sequentially sampling the reception signal for every distance section, and storing the reception signal in a memory; and
    an interference processing module for sequentially performing interference removal processing for the reception data of each of the distance sections stored in the memory;
    wherein the interference processing module includes:
    an interference wave determination module for determining for every distance section whether the reception data of the distance section row including a target distance section is resulting from an interference wave;
    a signal generating module, if the reception data is determined to be resulting from the interference wave for generating data to be displayed based on one or more reception data other than the reception data in proximity to the reception data at least either in a distance direction or a transmission cycle direction, and if the reception data is determined to be resulting from the reflection wave, for using the reception data as the data to be displayed; and
    a display module for displaying the data to be displayed.

2. The detection device of claim 1, wherein the interference wave determination module includes:
    a first feature value calculating module for calculating a first feature value based on each of the reception data in the distance section row for a current transmission;
    a second feature value calculating module for calculating a second feature value based on each of the reception data in the distance section row for a previous transmission;
    a first comparison module for comparing the first feature value with the second feature value;
    a second comparison module for comparing a preset one of the reception data in the distance section row for the current transmission and the corresponding first feature value with a predetermined threshold; and
    a determination module for determining that the reception data of the target distance section is resulting from the interference wave if the first feature value is greater than the second feature value and the preset one exceeds the predetermined threshold.

3. The detection device of claim 1, wherein the distance section row includes a plurality of distance section rows, and each distance section row has distance sections shifted by one distance section from other distance section rows; and wherein the interference wave determination module includes:

a first feature value calculating module for calculating a first feature value group based on each of the reception data of the plurality of distance section rows for current transmissions;

a second feature value calculating module for calculating a second feature value group based on each of the reception data of the plurality of distance section rows for previous transmissions;

a comparison module for comparing the first feature value group with the second feature value group for every corresponding feature value; and a determination module for determining that the reception data of the target distance section is resulting from the interference wave if substantially all the feature values of the first feature value group are greater than the feature values of the second feature value group, respectively.

4. The detection device of claim 1, wherein the distance section row includes a plurality of distance section rows, and each distance section row has distance sections shifted by one distance section from other distance section rows; and wherein the interference wave determination module includes:

a first feature value calculating module for calculating a first feature value group based on each of the reception data of the plurality of distance section rows for current transmissions;

a second feature value calculating module for calculating a second feature value group based on each of the reception data of the plurality of distance section rows for previous transmissions;

a first comparison module for comparing the first feature value group with the second feature value group for every corresponding feature value;

a second comparison module for comparing each of the reception data of the target distance section row including the target distance section with a predetermined threshold; and a determination module for determining that the reception data of the target distance section is resulting from the interference wave, if substantially all the feature values of the first feature value group are greater than the feature values of the second feature value group, respectively, and if substantially all the reception data exceed the predetermined threshold.

5. The detection device of claim 1, wherein the distance section row includes a plurality of distance section rows, and each distance section row has distance sections shifted by one distance section from other distance section rows; and wherein the interference wave determination module includes:

a first feature value calculating module for calculating a first feature value group based on each of the reception data of the plurality of distance section rows for current transmissions;

a second feature value calculating module for calculating a second feature value group based on each of the reception data of the plurality of distance section rows for previous transmissions;

a first comparison module for comparing the first feature value group with the second feature value group for every corresponding feature value;

a second comparison module for comparing each of the feature values of the first feature value group with a predetermined threshold; and a determination module for determining that the reception data of the target distance section is resulting from the interference wave, if substantially all the feature values of the first feature value group are greater than the feature value of the second feature value group, respectively, and if substantially all the feature values exceed the predetermined threshold.

* * * * *